US012694156B2

(12) United States Patent
Goodman

(10) Patent No.: US 12,694,156 B2
(45) Date of Patent: Jul. 28, 2026

(54) SECURITY AUDITING AND REMOTE ATTESTATION VIA KERNEL-SIGNED METRICS

(71) Applicant: Dell Products, L.P., Round Rock, TX (US)

(72) Inventor: Bradley K. Goodman, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 214 days.

(21) Appl. No.: 18/184,635

(22) Filed: Mar. 15, 2023

(65) Prior Publication Data

US 2024/0311515 A1      Sep. 19, 2024

(51) Int. Cl.
| | |
|---|---|
| *G06F 21/12* | (2013.01) |
| *G06F 21/57* | (2013.01) |
| *G06F 21/60* | (2013.01) |
| *G06F 21/62* | (2013.01) |
| *G06F 21/64* | (2013.01) |
| G06F 21/16 | (2013.01) |

(52) U.S. Cl.
CPC ............ *G06F 21/64* (2013.01); *G06F 21/602* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 10,193,694 | B1 * | 1/2019 | Guditz | ................... H04L 9/006 |
| 11,727,155 | B2 * | 8/2023 | Leinfellner | ........... H04L 9/0861 |
| | | | | 713/189 |
| 2009/0041252 | A1 * | 2/2009 | Hanna | ..................... H04L 63/12 |
| | | | | 380/278 |
| 2010/0017624 | A1 * | 1/2010 | Chan | ..................... G06F 21/125 |
| | | | | 717/177 |
| 2020/0074086 | A1 * | 3/2020 | Bulygin | ................ G06F 21/572 |
| 2021/0173661 | A1 * | 6/2021 | Cheng | .................. H04L 9/3247 |
| 2023/0246816 | A1 * | 8/2023 | Heilman | ............... H04L 9/0825 |
| | | | | 713/171 |
| 2024/0070247 | A1 * | 2/2024 | Mercier | ................. G06F 21/32 |

* cited by examiner

*Primary Examiner* — Venkat Perungavoor
(74) *Attorney, Agent, or Firm* — Fogarty LLP

(57) ABSTRACT

Systems and methods for security auditing and remote attestation via kernel-signed metrics are described and provide for the ability to collect data from a system to assess its security posture, while maximizing the confidence in that data, and minimizing the ability to compromise that data. Some embodiments provide a secured, attested way of providing data directly from the kernel in order to perform secure auditing, to provide data via remote attestation, or to perform remote secure auditing. Other embodiments provide for usage of a kernel as a smaller-footprint trusted execution environment.

14 Claims, 6 Drawing Sheets

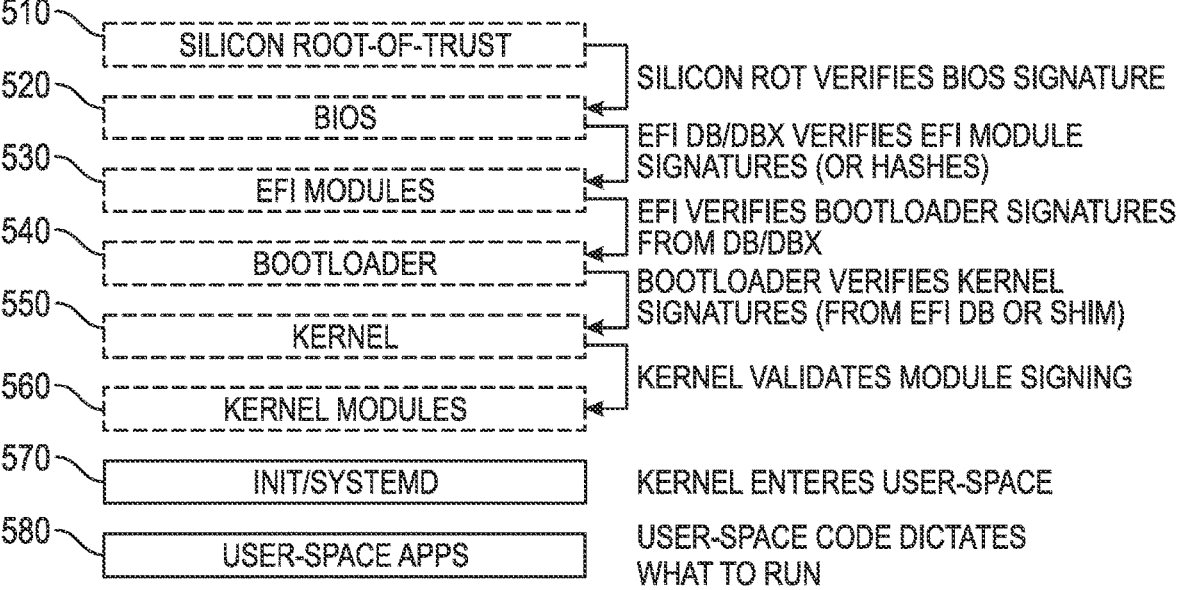

510 SILICON ROOT-OF-TRUST

SILICON ROT VERIFIES BIOS SIGNATURE

520 BIOS

EFI DB/DBX VERIFIES EFI MODULE
SIGNATURES (OR HASHES)

530 EFI MODULES

EFI VERIFIES BOOTLOADER SIGNATURES
FROM DB/DBX

540 BOOTLOADER

BOOTLOADER VERIFIES KERNEL
SIGNATURES (FROM EFI DB OR SHIM)

550 KERNEL

KERNEL VALIDATES MODULE SIGNING

560 KERNEL MODULES

570 INIT/SYSTEMD

KERNEL ENTERES USER-SPACE

580 USER-SPACE APPS

USER-SPACE CODE DICTATES
WHAT TO RUN

FIG. 5

SECURITY AUDITING AND REMOTE ATTESTATION VIA KERNEL-SIGNED METRICS

FIELD

This disclosure relates generally to Information Handling Systems (IHSs), more specifically to security auditing and remote attestation via kernel-signed metrics.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs provide users with capabilities for accessing, creating, and manipulating data, and often implement a variety of security protocols in order to protect this data. Historically, IHSs have been designed to implement security paradigms that isolate them from possible security threats, much like a castle is designed and constructed to safeguard persons within its walls. In the case of a network of IHSs, for example, security systems implement strategies that isolate the entire network from threats. In effect, a set of castle walls is constructed around the entire network. While working from within the walls of such systems, users may be provided with secure and productive use of data.

However, security paradigms that isolate protected data within the walls of a castle are increasingly frustrated by the realities of modern computing. Nowadays, users expect to access protected data using a plethora of different IHSs while located at a variety of physical locations. In an effort to leverage the security of the system providing access to the data, current protocols for supporting remote access have sought to extend the defenses of the system to remote IHSs, essentially extending the castle walls to temporarily include all or part of the remote IHSs.

The ability to audit a system, especially remote IHSs, is critical in the ability to validate its security posture. However, in doing so, we're often relying on information from the system itself as the basis of this assessment. Therefore, if the system is compromised, the auditing metrics from the system may also be compromised-leaving us unable to detect the anomaly. This is the fundamental idea behind a "rootkit". A rootkit, for example, is a collection of computer software, typically malicious, designed to enable access to a computer or an area of its software that is not otherwise allowed (for example, to an unauthorized user) and often masks its existence or the existence of other software.

SUMMARY

Systems and methods for security auditing and remote attestation via kernel-signed metrics are described. In an illustrative, non-limiting embodiment an Information Handling System (IHS) includes a processor; and a memory coupled to the processor, the memory having program instructions stored thereon that, upon execution, cause the processor to: receive a request from an external auditing system for information regarding the IHS; request, from a kernel of the IHS, the information regarding the IHS; receive, from the kernel of the IHS, information regarding the IHS comprising a cryptographic signature, wherein the cryptographic signature was produced using a private key of the IHS; and provide the information regarding the IHS comprising the cryptographic signature to the external auditing system for verification and analysis by the external auditing system.

In some embodiments, the private key is stored in a Trusted Platform Module (TPM) of the IHS. In some of these embodiments, the cryptographic signature was produced by the kernel using the private key is stored in the TPM. In other of these embodiments, the cryptographic signature was produced by the TPM using the private key is stored in the TPM.

In some embodiments, the program instructions further cause the processor to: receive, from an external auditing system, a cryptographic nonce; and providing, to the kernel of the IHS, the cryptographic nonce; wherein the information regarding the IHS received from the kernel of the IHS comprises the cryptographic nonce. In some of these embodiments, to provide the information regarding the IHS comprising the cryptographic signature to the external auditing system for verification and analysis, the program instructions further cause the processor to: provide the information comprising the cryptographic signature and the cryptographic nonce to the external auditing system for verification by the external auditing system based at least in part on the cryptographic signature and the cryptographic nonce.

In another illustrative, non-limiting embodiment, a method for security auditing and remote attestation via kernel-signed metrics comprises: requesting, from an IHS, information regarding the IHS; receiving, from the IHS, a response comprising information regarding the IHS and a cryptographic signature, wherein the information and the cryptographic signature was provided by a kernel of the IHS, and wherein the cryptographic signature was produced using a private key of the IHS; determining, based at least in part on a public key associated with IHS, that the cryptographic signature is valid; and verifying, based at least in part on the determination that the cryptographic signature is valid, the information regarding the IHS.

In some embodiments, the method further comprises: analyzing the information regarding the IHS to perform a security audit of the IHS. In some embodiments, the private key is stored in a Trusted Platform Module (TPM) of the IHS. In some embodiments, the cryptographic signature was produced by the kernel using the private key stored in the TPM. In some embodiments, the cryptographic signature was produced by the TPM using the private key stored in the TPM.

In some embodiments, the method further comprises providing, to the IHS, a cryptographic nonce. In some of these embodiments, the information regarding the IHS received from the IHS is encrypted, and the determining, based at least in part on the public key associated with IHS, that the cryptographic signature is valid further comprises: decrypting the information regarding the IHS using the public key to produce decrypted information regarding the IHS and the cryptographic nonce; and determining that the decrypted information regarding the IHS and the cryptographic nonce are valid. In some embodiments, the requesting, from an IHS, information regarding the IHS further comprises: requesting information from a secure overlay of a filesystem of the IHS.

In another illustrative, non-limiting embodiment, a memory storage device having program instructions stored thereon that, upon execution by one or more processors of one or more Information Handling Systems (IHSs), cause the one or more IHSs to: receive, by a kernel of the IHS, a request for information regarding the IHS; obtain, by the kernel, the information regarding the IHS; determine a cryptographic signature based at least in part on the information regarding the IHS and a private key associated with the IHS; and provide, by the kernel, the information regarding the IHS and the cryptographic signature for verification and analysis by an auditing system.

In some embodiments, the private key is stored in a Trusted Platform Module (TPM) of the IHS. In some embodiments, to determine the cryptographic signature, the program instructions further cause the one or more IHSs to: obtain, by the kernel, the private key from the TPM; and determine the cryptographic signature, by the kernel, using the private key stored in the TPM. In some embodiments, to determine the cryptographic signature, the program instructions further cause the one or more IHSs to: determine the cryptographic signature, by the TPM, using the private key stored in the TPM.

In some embodiments, the program instructions of the memory storage device further cause the one or more IHSs to: receive, by a kernel of the IHS, a cryptographic nonce; wherein to determine the cryptographic signature based at least in part on the information regarding the IHS and the private key, the program instructions further cause the one or more IHSs to: determine a cryptographic signature based, at least in part, on the cryptographic nonce, the private key associated with the IHS, and the information regarding the IHS.

In some embodiments, to provide, by the kernel, the information regarding the IHS and the cryptographic signature for verification and analysis by an auditing system, the program instructions further cause the one or more IHSs to: provide, by the kernel, the information regarding the IHS, the cryptographic signature, and the cryptographic nonce for verification and analysis by an auditing system.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 5 is a diagram generally depicting a standard secure boot process, according to some embodiments.

DETAILED DESCRIPTION

Figure 1:
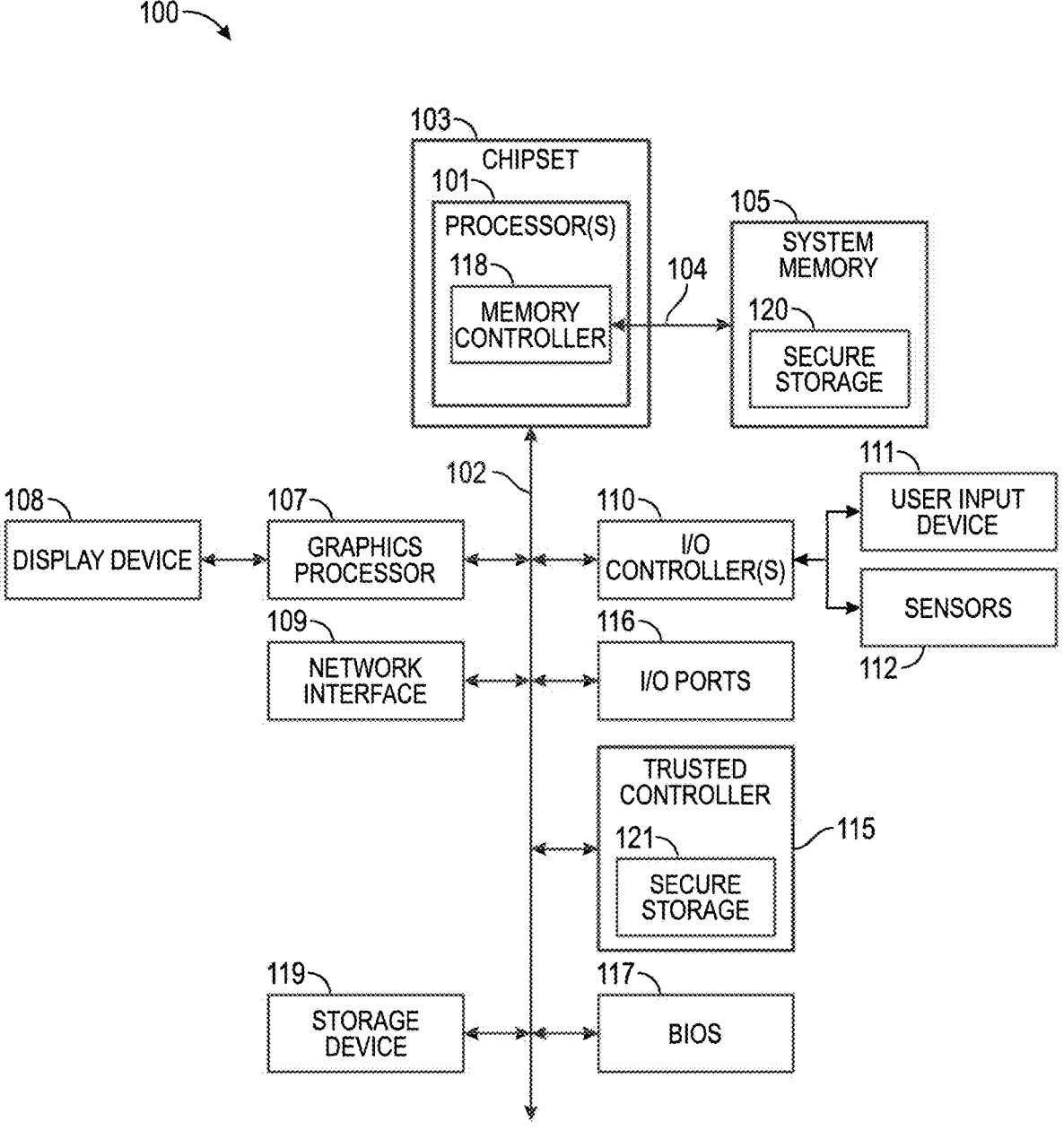
FIG. 1 is a diagram depicting illustrative components of an Information Handling System (IHS) configured, according to various embodiments, to support security auditing and remote attestation via kernel-signed metrics on the IHS.

Some embodiments of the systems and methods for security auditing and remote attestation via kernel-signed metrics provide for the ability to collect data from a system to assess its security posture, while maximizing the confidence in that data, and minimizing the ability to compromise that data. In addition, some embodiments provide a secured, attested way of providing data directly from the kernel. In addition, some embodiments provide a secured, attested way of providing data directly from the kernel as a means to do secure auditing. Some embodiments provide a secured, attested way of providing data directly from the kernel as a means for providing data via remote attestation. In addition, some embodiments provide a secured, attested way of providing data directly from the kernel as a means to do remote secure auditing. Finally, some embodiments provide for usage of a kernel as a smaller-footprint trusted execution environment.

A kernel is a computer program at the core of a computer's operating system (OS), that generally has control over everything or almost everything in the system. It can be the portion of the operating system code that is mostly resident in memory. It can facilitate interactions between hardware and software components. A full kernel can control all hardware resources (e.g., I/O, memory, cryptography) via device drivers, arbitrates conflicts between processes concerning such resources, and optimizes the utilization of common resources (e.g., CPU & cache usage, file systems, and network sockets). On most systems, the kernel is one of the first programs loaded on startup (after the bootloader). The kernel, in some embodiments, can handle the rest of startup as well as memory, peripherals, and input/output (I/O) requests from software, translating them into data-processing instructions for the central processing unit.

A kernel, in some embodiments, can be a readily securable, trusted entity which fundamentally has access to some or all low-level data of a system. A kernel, in some embodiments, can be an open-source, third-party verifiable, auditable, cryptographically certified, trust-rooted entity, providing a more-secured source of information about a system. If such information is cryptographically signed by the kernel itself, then that information can be used and trusted by internal and external entities for the purposes of security auditing and assessment. This can remain true, in some embodiments, even when much more complex control planes and management systems use higher-level software and transports (hardware, software and firmware) to convey this data. The final security assessment can be done by other internal or external trusted entities, if those entities have confidence in the raw metrics and data collected from the sources, such as the kernel.

Therefore, some embodiments of the present disclosure provide a more reliable (e.g., smaller attack vector) means to provide attestation data of the functional software environment of an endpoint to an internal or remote attestor (management or control plane), in a way that it cannot be influenced or otherwise compromised by nefarious or compromised code running on the endpoint. In some embodiments, this nefarious or compromised code may even be required in the collection, transport and/or delivery of the attestation data itself. More specifically, in some embodiments, the smaller footprint of a secure, signed kernel can be a more auditable, and more secure, source of information, as the sheer number for vulnerabilities are more constrained. In addition, a secure, signed kernel can be a tamper-resistant source of information. Therefore, in some embodiments, the required information a validating party would need in order to assess the security posture of a device (i.e. what is running on it) can be originated by the kernel itself.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, such as laptop computers, other embodiments may utilize various other types of IHSs, such as rack-mounted servers.

FIG. 1 is a diagram depicting illustrative components of an Information Handling System (IHS) 100 configured, according to various embodiments, to support security auditing and remote attestation via kernel-signed metrics. In some embodiments, IHS 100 may be employed to execute an operating system that includes a kernel. The IHS 100 might be a system under audit, or an auditing system, or both a system under audit and an auditing system. The IHS might execute a kernel that provides system data in a secured and/or attested way.

As shown in FIG. 1, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions. Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a segregated and protected portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. As described in additional detail below, in certain embodiments, network interface 109 may support connections between a trusted IHS component, such as trusted controller 115 or Trusted Platform Module (TPM), and a remote orchestration service. In such embodiments, a connection supported by network interface 109 between the remote orchestration service and the trusted component may be considered an out-of-band (OOB) connection that is isolated from the OS of the IHS. In some embodiments, an OOB connection supported by network interface 109 may support a variety of remote management operations by trusted controller 115, including providing remote management of IHS 100 and/or of hardware components installed in IHS 100. As described in additional detail below, embodiments of IHS 100 may utilize OOB connections to interface with multiple remote orchestration services that may each provide different types of support for workspaces operating on IHS 100.

Chipset 102 of IHS 100 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD. LED, OLED, or other thin film display technologies. Each display device 108 may be capable of touch input such as via a touch controller that may be an embedded component of display device 108, graphics processor 107, or a separate component of IHS 100 accessed via bus 102. In some embodiments, an external display device coupled to IHS may include discrete logic and memory resources that may be used in the operation of a workspace. In some scenarios, an external display device coupled to IHS 100 may be a public or shared-use display monitor, such as provided to the user of IHS 100 via a shared or public workstation.

In certain embodiments, chipset 103 may utilize one or more I/O controllers 110 to access hardware components such as user input devices 111 and sensors 112. For instance, I/O controller 110 may provide access to user-input devices 111 such as a keyboard, mouse, touchpad, touchscreen and/or other peripheral input devices. User input devices 111 may interface with I/O controller 110 through wired or wireless connections. In some embodiments, any or all of the user-input devices 111 coupled to IHS may be discrete devices with their own logic and memory resources that may be used in the operation of a workspace. In some scenarios, user-input devices 111 coupled to IHS 100 may be a public or shared-use devices, such as a keyboard and mouse of a shared or public workstation.

A variety of external devices may be coupled to IHS 100, such as via I/O ports supported by I/O controllers 110 and/or via network interface 109. The external devices may include user-input devices, such as a mouse, camera or keyboard, user-output devices, such as an HMD, external display, projector or headphones. In some instances, an external device coupled to IHS 100 may include standalone IHS, such as a mobile cellular device that may be coupled to the IHS via a wired or wireless connection.

Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.). In some embodiments, any or all of the sensors 112 coupled to IHS may be discrete devices with their own logic and memory resources that may be used in the operation of a workspace.

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction thus indicating the IHS 100 is being used in a book mode). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, inattentive and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of IHS 100 within a proximity of IHS 100 may result in a change in the security context of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. Starting from a closed position, a first range of hinge angles may indicate a laptop posture, a second range of hinge angles may indicate a landscape posture, and a third range of hinge angles may indicate a tablet posture of the IHS 100. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side with the hinge in a vertical orientation, the IHS may be determined to be in a book mode. In another example where the IHS 100 is determined to be tilted such that the hinge is oriented between horizontal and vertical, the user's face is detected to be facing the integrated display, and IHS 100 is experiencing irregular, slight movements, the sensor hub may determine that IHS 100 is being used in a book posture while the user is in transit. In another example, the sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100. In some embodiments, peripherals coupled to IHS 100 via I/O ports 116 may be discrete devices with their own logic and memory resources that may be used in the operation of a workspace. In some scenarios, external peripherals coupled to IHS 100 may be a public or shared-use devices, such as a projector utilized within a conference room.

Chipset 103 also provides processor(s) 101 with access to one or more storage devices 119. In various embodiments, storage device(s) 119 may be integral to IHS 100, or may be external to IHS 100. In certain embodiments, storage device(s) 119 may be accessed via a storage controller that may be an integrated component of the storage device. Storage device(s) 119 may be implemented using any memory technology allowing IHS 100 to store and retrieve data. For instance, storage device(s) 119 may be a magnetic hard disk storage drive or a solid-state storage drive. In some embodiments, storage device(s) 119 may be a system of storage devices, such as a cloud drive accessible via network interface 109. In some embodiments, storage devices 119 coupled to IHS 100 may be discrete devices with their own logic and memory resources that may be used in the operation of a workspace.

As illustrated, IHS 100 also includes BIOS (Basic Input/ Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, a trusted controller 115, such as a Trusted Platform Module (TPM), is coupled to IHS 100 and may support various functions for management of IHS 100. For example, trusted controller 115 may be an embedded controller (EC) that is installed as a component of the motherboard of IHS 100. In various embodiments, trusted controller 115 may perform various operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service. In some embodiments, such out-of-band communications may be utilized by a remote orchestration service in communicating with the trusted controller 115 in selecting the resources of the IHS that are used as the underlying computing architecture that is used to host a workspace on the IHS 100.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also provide support for certain cryptographic processing used to support secure deployment and operation of workspaces on IHS 100. In some embodiments, such cryptographic processing may be provided via a secure logical environment that operates using computational and memory resources of trusted controller 115, where the environment operates in isolation from the software and other hardware components of IHS 100. In some embodiments, trusted controller 115 may rely on cryptographic processing provided by dedicated cryptographic hardware supported by the IHS, such as a TPM (Trusted Platform Module) microcontroller. In some embodiments, the memory resources of trusted controller 115 include a secured storage 121 that may be utilized to store cryptographic information for use in authorization of workspaces.

In certain embodiments, cryptographic capabilities of trusted controller 115 may be used to calculate signatures that uniquely identify individual components of IHS 100. In such scenarios, trusted controller 115 may calculate a hash value based on instructions used to configure a hardware component coupled to IHS 100 and/or based on a set of instructions used to operate a software program. For instance, trusted controller 115 may calculate a hash value based on firmware, settings and/or other instructions that are used in the operation of a hardware component coupled to the IHS 100, such as by a network controller, storage drive, storage controller, FPGA, or hardware accelerator. In some instances, reference signatures for individual components of an IHS 100 may be calculated as part of a trusted manufacturing and factory provisioning process of the IHS and may be stored for use as reference signatures within a secure storage 121 of the trusted controller 115.

Once the IHS 100 has been delivered and deployed, trusted controller 115 may be configured to calculate hash values based on firmware and other instructions that are loaded for use by individual hardware components of the IHS. The hash value recalculated for the component may then be compared against the reference signature in order to determine if any modifications have been made to the instructions to be used to operate the component, thus indicating the component has been compromised. In this manner, trusted controller 115 may be used to validate the integrity of hardware and software components installed on IHS 100. In certain embodiments, remote orchestration service 206 may verify the integrity of trusted controller 115 in the same manner, by calculating a signature based on instructions being utilized to operate trusted controller 115 and comparing it to a reference signature calculated during a trusted process for manufacture of IHS 100. In various embodiments, one or more of these operations supported by trusted controller 115 may be implemented using BIOS 117.

In some embodiments, firmware instructions utilized by trusted controller 115 may also implement procedures for the management of power that is available for operating IHS 100. For instance, trusted controller 115 may interface with a power adapter in managing the output levels of the power adapter that may be drawn for use by IHS 100. In some embodiments, trusted controller may determine the power status of IHS 100, such as whether IHS 100 is operating strictly from battery power or is plugged into an AC power source, and may specify restrictions on power use based on the power status of the IHS. Trusted controller 115 may be used to operate a secure execution environment that may include operations for managing various core functions of IHS 100 based on power availability, such as power management and management of certain operating modes of IHS 100 (e.g., turbo modes, maximum operating clock frequencies of certain components, etc.). Accordingly, IHS 100 may support the use of various power modes. In some embodiments, the power modes of IHS 100 may be implemented through operations of trusted controller 115 and/or the OS of IHS 100. In various embodiments, IHS 100 may support various reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

As described in additional detail below, an IHS 100 may support the operation of one or more workspaces, each operating using resources of IHS 100 that are specified within a respective workspace definition, where an individual workspace provides operation of software programs and access to protected data in varying degrees of isolation from the operating system of the IHS and from other workspaces. Also as described in additional detail below, an individual workspace may be hosted by an IHS 100 using various combinations of the described software and hardware resources of the IHS. For instance, a workspace may be configured to operate as a type of virtual machine that runs in isolation from the operating system of the IHS 100, but that relies on certain shared software libraries and other resource of the IHS 100. In another instance, a workspace may operate as a different type of virtual machine that not only runs in isolation from the operating system of the IHS 100, but also does not share any libraries and operates using a segregated portion of memory 105 of the IHS. In another instance, a workspace may operate as a container application that runs within the operating system of the IHS 100, but that provides a segregated computing environment in which applications and data that are accessed via the container are not otherwise accessible by other programs or containers hosted by the operating system. In another instance, a workspace may operate within the operating system of an IHS 100 as a web-browser application that runs using libraries and other resources utilized by the web browser. In another instance, a workspace may be configured to operate such that a graphical interface for the workspace is displayed in a display device 108, of the IHS 100, but the workspace operates in full or in part in a cloud resource, thus isolating certain aspects of the workspace entirely from the IHS 100.

Each of these exemplary computing architectures that utilize resources of IHS 100, to support workspaces present different attack surfaces that may be exploited by malicious actors. As described in additional detail below, the computing architecture that is selected for use by a workspace may be selected based in part on a security context that may account for the security posture of the IHS 100, the user of the IHS 100, the use of subordinate workspaces, the environment in which IHS 100 is being operated and/or the information that is being accessed via the workspace. As such, the attack surface presented by the computing architecture of a workspace, and any subordinate workspaces, may be selected to be commensurate with the security context in which the workspace will operate. Further, embodiments of the present systems and methods for security auditing and remote attestation via kernel-signed metrics may be employed to secure these workspaces.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as a System-on-Chip.

Figure 2:
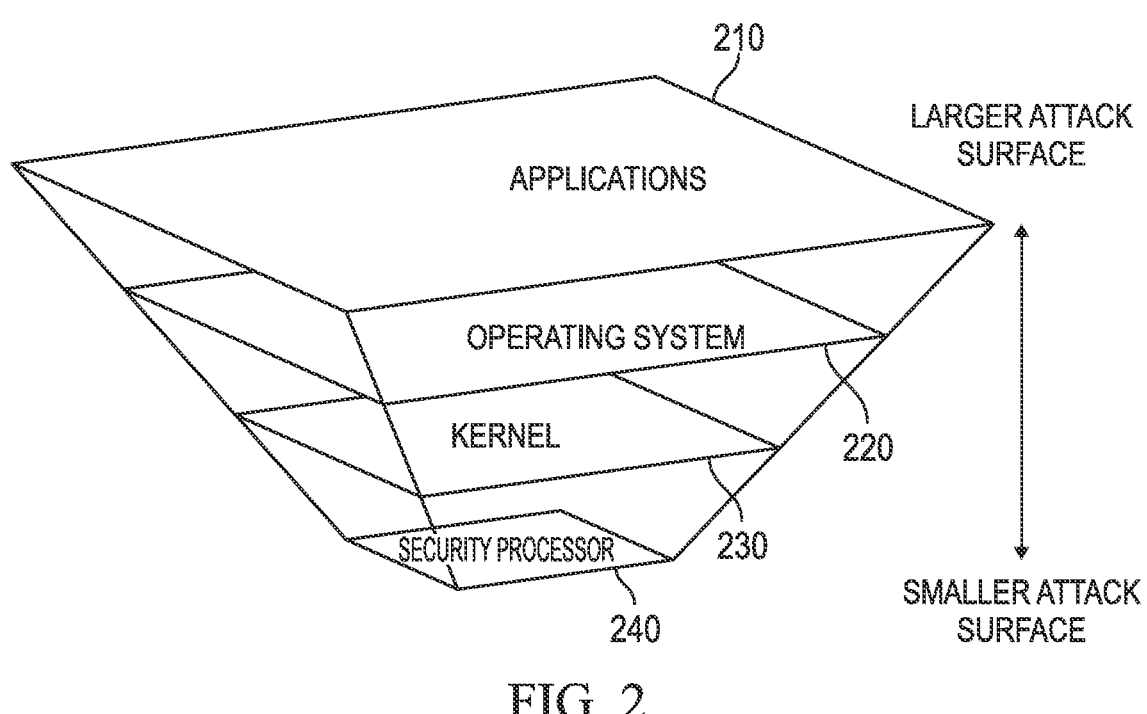
FIG. 2 is a diagram depicting a security architecture of an IHS, according to some embodiments.

FIG. 2 is a diagram depicting a security architecture of an IHS, according to some embodiments. FIG. 2 2 depicts that smaller, narrower-scoped, audited, independent components are able to achieve levels of trust that larger, more flexible, open, shared, configurable, dynamic ones are not. For example, FIG. 2 depicts that a security processor 240 has the smallest attack surface of the devices shown. The next smallest attack surface can be the kernel 230. A larger attack surface can be the entire operating system 220. Finally, applications have the largest attack surface as they are usually larger, more flexible, open, shared, configurable and/or dynamic.

A classic, but somewhat simplified, example is the security processor on a cell phone. It can have a simple, sometimes physical, interface to the "main" processor. It may be a physically hardened storage component, which exposes few interfaces to the main CPU, and/or shares no code or memory directly with it. Such a security processor may simply store, for example, a password. It may have a fingerprint sensor integrated directly into it. It can provide a physical interface, and a simple API by which the system may ask it to reveal a password. It may do so, for example, if a user's fingerprint matches. Such a security processor can be small and purpose built, expose few APIs, share minimal (or no) resources with the main system. It can be therefore easier to audit, and even can be subject to third-party independent security audits. It can be audited, for example, without prejudice of revealing underlying proprietary secrets of the main operating system or hardware that a vendor may not want to be subject to, or an auditor would have little expertise in being able to assess. Therefore, smaller, more isolated, and/or less-configurable ("lower entropy") components in the security stack are less complex, easier to audit, and expose a smaller attack surface than large-scale components of the system.

Figure 3:
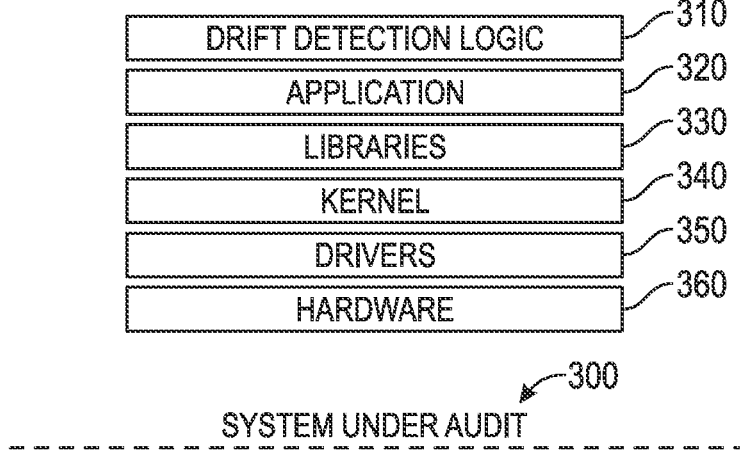
FIG. 3 is a diagram depicting drift detection logic in a system under audit, according to some embodiments.

FIG. 2 depicts that a kernel 230 is capable of being a smaller, more secreted, lower-footprint source of information. A kernel 230, in some embodiments, can have very few components it relies on. For example, a kernel 230 can rely on hardware only, with no underlying software. A kernel can be the originator and authority of any data pertaining to the state of any software running over or within the system (e.g., the process tables themselves). Therefore, in some embodiments, any statement signed by a kernel (e.g., with a private-key that is associated with a known public-key), even if traversed through a complex and (potentially) compromised stack above it, can be trusted. Any attack can inherently be detected (e.g., by an invalid signature) by an internal or outside attesting party, in some embodiments. Thus, having such raw information directly from a kernel allows an internal or outside attesting party to directly assess the operation posture of (e.g., the software running on) that system with a high degree of confidence FIG. 3 is a diagram depicting drift detection logic in a system under audit, according to some embodiments. FIG. 3 depicts problems that can occur when security auditing or attestation in a larger-scale system. FIG. 3 discloses that a system under audit 300 can consist of hardware 360, drivers 350, a kernel 340, libraries 330, an application 320, and drift detection logic 310. The drift detection logic 310 is an example of any kind of security auditing and/or attack prevention in a larger-scale system. Specifically with regard to drift detection, however, concept drift or drift can be an evolution of data that invalidates the data model. This can occur in in predictive analytics, data science, machine learning and related fields. It can happen when the statistical properties of the target variable, which the model is trying to predict, change over time in unforeseen ways. This causes problems because the predictions become less accurate as time passes. Drift detection and drift adaptation are of paramount importance in the fields that involve dynamically changing data and data models.

In a typical system which runs any kind of drift detection 310, it is running code that relies on other software and/or hardware of the system under audit 300. For example, drift detection logic 310 can rely on applications 320, libraries 330, the kernel 340, drivers 350, and hardware 360 to make accurate predictions. Therefore, an attack such as a rootkit or other compromises of any of those components, can compromise the drift detection 310 itself.

Figure 4:
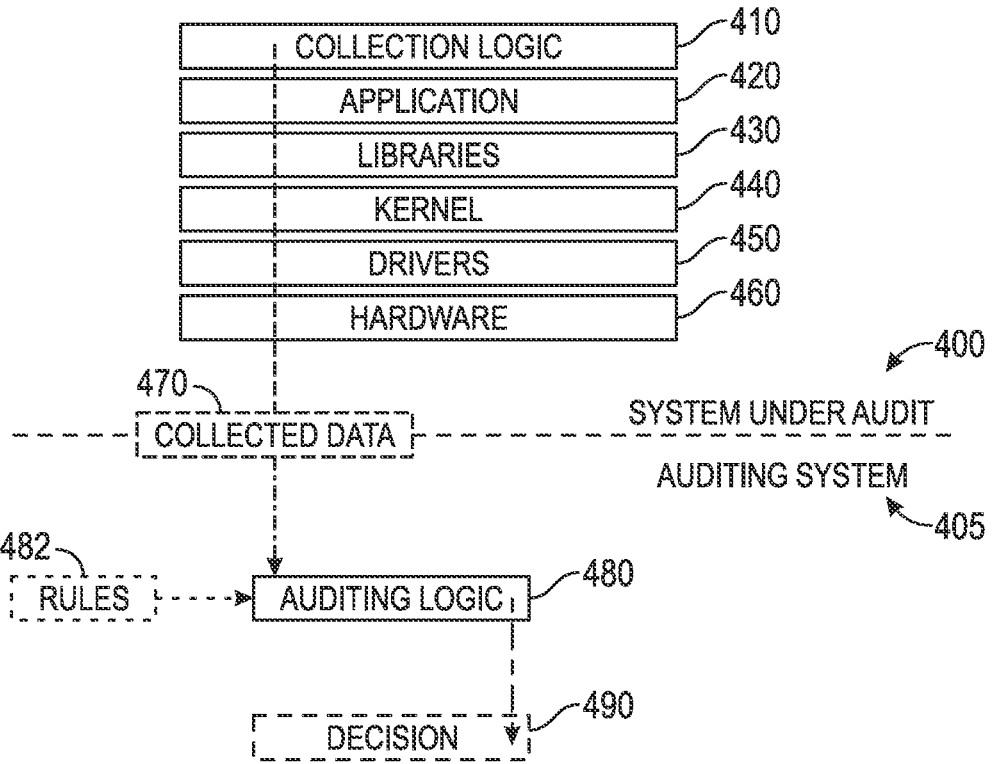
FIG. 4 is a diagram depicting remote attestation of a system under audit with system-provided data, according to some embodiments.

FIG. 4 is a diagram depicting remote attestation of a system under audit with system-provided data, according to some embodiments. In distributed, network and interconnected systems one can attempt to remove the implicit trust in the system under audit 400 through the use of remote auditing and monitoring by an auditing system 405. However, the aforementioned weaknesses of FIG. 3 still can still be applicable. Any data being collected by the collection logic 410 is being collected by the system under audit 400 itself. For example, the collection logic 410 can rely on an application 420, libraries 430, the kernel 440, drivers 450, and hardware 460 to make accurate predictions. Therefore, an attack such as a rootkit or other compromises of any of those components, including an attack on the collection logic 410, can compromise the collection logic 410. Thus, the auditing logic 480 is making auditing assessments of a system under audit 400 based upon collected data 470 which came from a source (system under audit 400) which the auditing system 405 is trying to assess the security of. The auditing logic 480 can apply the collected data 470 to rules 482 to make a decision 490. The correctness of the decision 490 is based on how trustworthy the collected data 470 is.

In some embodiments, an auditing system 405 can rely on processes such as remote attestation, by which data 470 is collected from systems under audit 400. With remote attestation, the system under audit 400 would simply make available information as to its own configuration. However, this still relies on the data coming from the system under audit 400—including all of the data, software, stacks, libraries, etc. However, all of these components or layers can still compromisable under any kind of breach of the larger system on-whole. The auditing system 405 might make the system under audit 400 prove the security posture itself (to the extent it can be trusted). However, if portions of the system under audit 400 are vulnerable to attacks, this procedure can still be problematic. A better procedure is for the auditing system 405 to independently prove from where the collected data 470 was collected. Some embodiments of the present disclosure allow for the auditing system 405 to independently prove from where the collected data 470 was collected.

FIG. 5 is a diagram generally depicting a standard secure boot process, according to some embodiments. FIG. 5 depicts that the kernel 550 is a third-party verifiable, auditable, cryptographically certified, trust-rooted entity, providing a more-secured source of information. The kernel represents a "smaller attack surface" as was discussed with regard to FIG. 2. FIG. 5 depicts that a kernel is "trust-rooted." Trust-rooted refers to the trustworthiness of the processes by which a modern kernel is booted and secured. First, a "Silicon Root of Trust" 510 (which can go by different names such as TrustZone or BootGuard, etc.) can verify the BIOS 520 signature. Then the BIOS 520 can verify an Extensible Firmware Interface (EFI) module 530 signature or hash. In some embodiments, an EFI database within the BIOS 520 can be accessed to help verify this. Then, EFI modules 530 can verify bootloader 540 signatures from, for example, the database. The bootloader 540 can verify kernel 550 signatures from, for example, the EFI database or a shim. A shim, for example, can be a library that transparently intercepts API calls and changes the arguments passed, handles the operation itself or redirects the operation elsewhere. The kernel 550 can then validate kernel modules 560 signing.

Trusted Computing Group (TCG) standards such as Secure Boot and Measured Boot can form this secure chain which can be rooted from the very first instruction the computer issues, right up to the loading and execution of the kernel and its modules. Each stage in this process can be signed, verified, trusted, and rooted by the previous stage. A system can be configured with a very high degree of reliability that it is executing as authorized by the entity who configured this system—be that a user, administrator or a platform or solution vendor.

This chain of trust can end when the kernel modules load, and the system begins to run in user-space. At this point in time, a system will basically do whatever it has been configured to. In UNIX systems, for example, init/systemd 570 launches daemons. Users run user-space apps 580. All these can come from a filesystem. There are always new and evolving ways to secure these, but the same problems persist. The more you "lock down" a system, the more inflexible it becomes. A system can use extreme and custom measures to control what a system can do. However, most systems will trust and run whatever it is told to run, from, for example, components such as an/etc/systemd configuration file. In addition, most systems will blindly assume that whatever is on disk is "okay".

Figure 6:
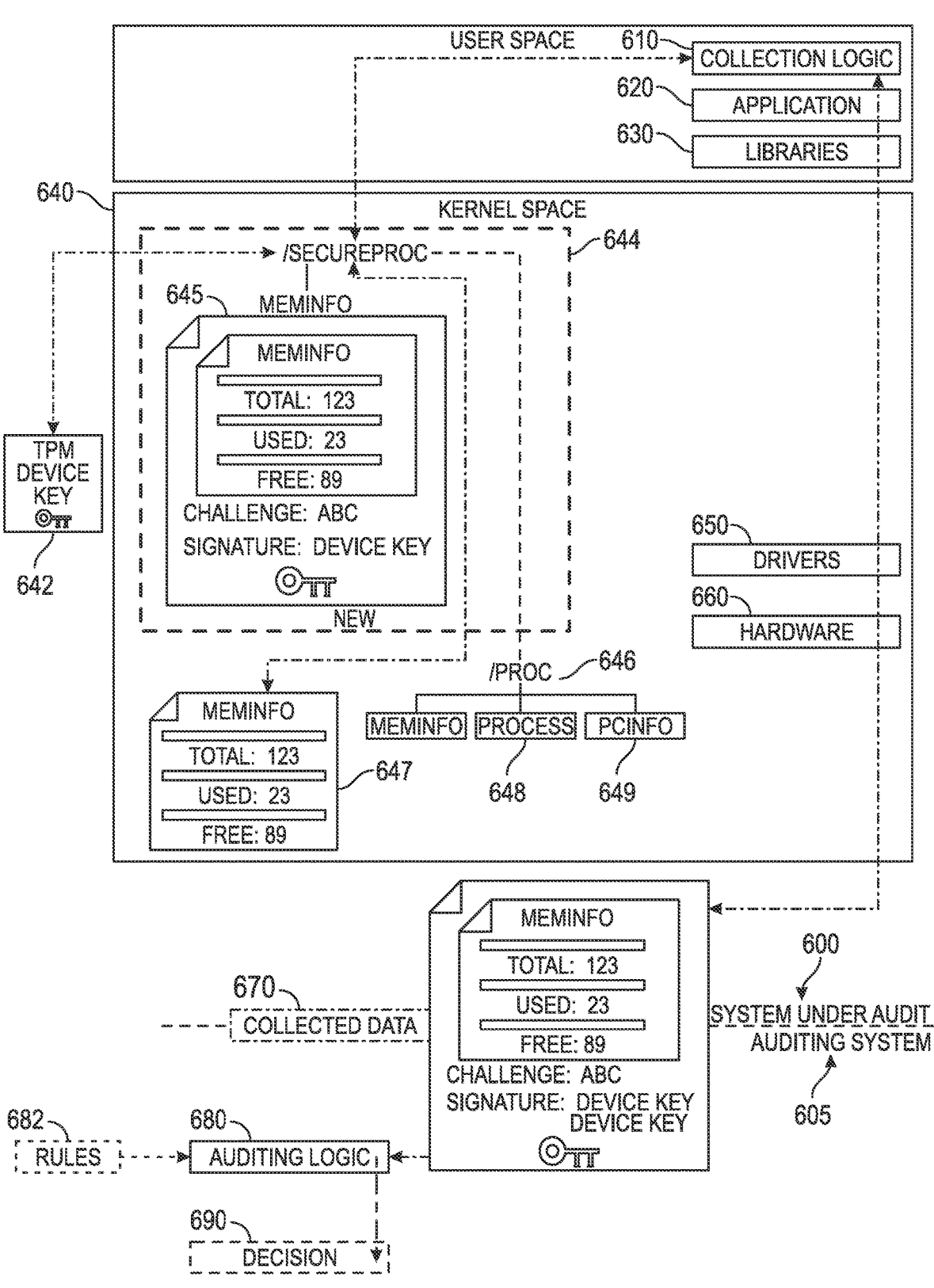
FIG. 6 is a system architecture block diagram generally depicting a secured, remote kernel auditing data collection system, according to some embodiments.

FIG. 6 is a system architecture block diagram generally depicting a secured, remote kernel auditing data collection system, according to some embodiments. FIG. 6 depicts an architecture where an auditing system 605 is able to collect data from a system under audit 600 so as to assess its security posture. In some embodiments, this can occur while maximizing the confidence in that data, and minimizing the ability to compromise that data. This information can be given to a (trusted) third-party for analysis, such as the auditing logic 680 of FIG. 6. However, that trusted third party needs to be able to verify and trust the data and the source of that data.

FIG. 6 depicts the similar components for the system under audit 600 as FIG. 4: the collection logic 610, application 620, libraries 630, the kernel 640, drivers 650, and hardware 660. The kernel 640 itself is a readily securable, trusted entity, which fundamentally has access to all low-level data of a system. Device onboarding (and secure onboarding) are processes by which establish credentials, such as cryptographic credentials, between a device and its control plane. After doing so, such credentials (including a keys which could be held and managed by the TPM 642) can be used only by that system to sign any given data.

Kernels 640 have many facilities to make data available from them. For illustrative purposes, FIG. 6 references the/proc filesystem 646 in the Unix or Linux kernel. The/proc 646 (and/sys) can make available a lot of information about a system, such as it's hardware (through/proc/pcinfo 649), configuration, consumption, runtime metrics, drivers, memory (through/proc/meminfo 647), and also information about the processes running on the system itself (through/proc/process 648).

In the embodiments depicted in FIG. 6, the kernel is the holder of such auditing information, because it is a smaller, more-trusted place in which data can be made available. The kernel can be relied on to collect this data from the system under audit 600. If this data is proven to have come from the kernel on this system, trusted remote auditing code should be able to use it and consider it trustworthy.

In some embodiments, a TPM 642 can be onboarded with a set of key/credentials which have been established to uniquely identify this device under audit. In some of these embodiments, the kernel 640 has direct drivers and the ability to talk to such a TPM 642. Therefore, the kernel 640 can use the TPM 642 to directly sign the kernel's own data and make it available to the remote system.

The embodiments of FIG. 6 depict an "overlay"-type of driver, filesystem or module which would effectively provide a shadow interface to that of underlying driver, filesystem, or module. The example of FIG. 6 depicts/secureproc 644 overlaying/proc 646. In other examples, such an overlay could also provide a shadow interface to any other type of filesystem, such a/sys, depending on the embodiment. This/secureproc 644 interface would provide the same underlying data 647 as its underyling filesystems/proc 646 (i.e. /secureproc 644 could overlay/proc 646). However, the overlay type of driver, filesystem or module can provide a couple of additional capabilities, depending on the embodiment.

First, the information coming from the underling driver, filesystem or module can be cryptographically signed by the overlaying driver, filesystem or module. In FIG. 6, this signature can be produced by either the kernel 640 or by the TPM 642, via a device-specific key stored in the TPM 642. In FIG. 6, the meminfo 647 can be cryptographically signed to produce a signed meminfo 645 for use by/secureproc 644. The cryptographic signature process can comprise either encrypting the original information 647 using the device key into an encrypted (and therefore signed) meminfo 645, in some embodiments. In other embodiments the cryptographic signature process can encompass combining encrypted information computed from the original information 647 and the private key, along with the unencrypted original information 647 to produce the signed meminfo 645. Second, the overlying (e.g., secure) interface can provide the capability for a requester, such as the auditing system 605, to specify a cryptographic "challenge" or "nonce." The challenge can be placed in the same signed body 645 as the rest of the underlying data. The cryptographic signature process can use this cryptographic nonce in cryptographically signing the original information. This can be used as a means to counter reply-attacks. In FIG. 6, the challenge or nonce "ABC" was provided by the auditing system 605 and included in the same signed body 645 as the meminfo data.

In some embodiments, the secure driver, filesystem or module (such as/secureproc 644) can either have some means to access a cryptographic key in the TPM 642 (i.e. through a hierarchy or piece of hardware available only to the kernel), or a means to otherwise specify a key which is only available to the kernel 640, and not to any other general-purpose piece user code, such as applications 620 or libraries 630, depending on the embodiment. The internal or external auditing system 605 can make a request for raw audit data (e.g., collected data 670) of the system under audit 600. In some embodiments, the auditing system 605 can provide the system under audit 600 with its own generated cryptographic nonce. Depending on the embodiment, the request might get from the auditing system 605 to the system under audit 600 via means such as standard network transports, protocols, security, libraries, stacks, etc. The resulting data 645 might return from the system under audit 600 to the auditing system 605 by such means as standard network transports, protocols, security, libraries, stacks, etc.

FIG. 6 depicts the auditing system 605 interfacing with the collection logic 610 of the system under audit 600. The collection logic 610 queries the secure driver, filesystem or module (e.g., /secureproc 644). The secure driver, filesystem or module provides a signed result 645 that includes the data (e.g., meminfo 647) plus the challenge or nonce in a signed package 645. The collection logic 610 then provides that signed package (i.e., the collected data 670) to the auditing system 605. The auditing logic 680 applies rules 682 to the data 670 in order to determine some kind of a decision 690, such as a decision about whether the data is trustworthy.

Therefore, in some embodiments, the collected data 670 is coming from the kernel 640 itself. The collected data 670 can be independently verifiable by the auditing system 605. In some embodiments, the auditing system 605 requires only knowledge of the system under audit's public device key. If any of these other layers and/or software within the system under audit 600 (e.g., libraries 630, application 620, or collection logic 610) were to be compromised, they would be incapable of spoofing or providing fraudulent auditing data, because the kernel 640 alone has access to the signing resources.

In some embodiments, an implementation described would include a few major components: (1) A kernel device driver, filesystem or module (e.g., /secureproc 644) which could overlay another kernel provided driver, filesystem or module (e.g., /proc 646). In some embodiments, the overlay can wrap its contents in a TPM 642, or any other secured signing system-signed envelope, depending on the embodiment. (2) A system to establish a private key on the device under audit 600 whose public key is available on the auditing system-such as done in any Secure Onboarding process. (3) Auditing logic or code 680 on a trusted, auditing system 605, which has the rules and logic to ascertain what is and is not a proper, valid operation of the system under audit 605. (4) Code on the system under audit 600 to accept requests from an auditing system 605, collecting that data from the secured kernel driver, filesystem or module (e.g., /secureproc 644), and returning that data to the auditing system 605. In FIG. 6, this is depicted as the collection logic 610.

The protocol and security between these two systems can be implementation dependent, depending on the embodiment. For example, much of the data on the system under audit 600 might be confidential. Thus it would be up to the collection logic 610 to be able to authenticate the auditing system 605. In some embodiments, designers of a system under audit 600 may not want to allow all information presented by such kernel drivers, filesystems or modules (e.g., /secureproc 644), to even be made available to the auditing system 605. Thus, the system under audit 600 might apply its own rules, security and filtering for specific requests as it sees fit, depending on the embodiment.

Figure 7:
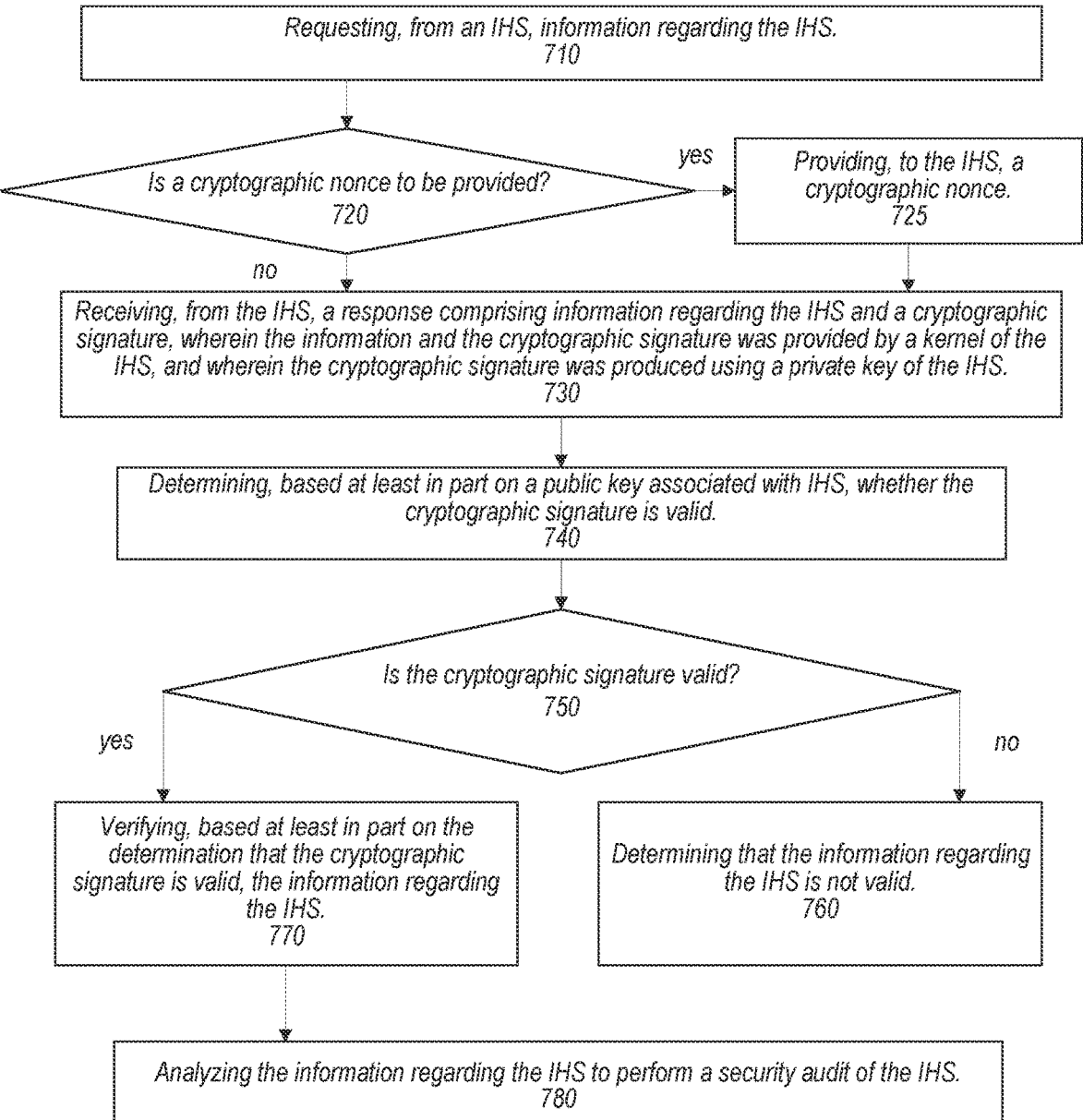
FIG. 7 is an operational flowchart diagram depicting the operation of an auditing system, according to some embodiments.

FIG. 7 is an operational flowchart diagram depicting the operation of an auditing system, according to some embodiments. FIG. 7 begins at 710 with the auditing system requesting, from an IHS, information regarding the IHS. The auditing system determines if a cryptographic nonce is to be provided in 720. If a cryptographic nonce is to be provided, the auditing system provides to the IHS the cryptographic nonce at 725. If a cryptographic nonce is not to be provided, the flowchart proceeds immediately to 730.

At 730, the auditing system receives, from the IHS, a response comprising information regarding the IHS and a cryptographic signature, where the information and the cryptographic signature was provided by a kernel of the IHS, and where the cryptographic signature was produced using a private key of the IHS. The flowchart transitions to 740 where the auditing system determines based at least in part on a public key associated with IHS, whether the cryptographic signature is valid.

If the cryptographic signature is not valid at 750, the flowchart transitions to 760 where the auditing system determines that the received information regarding the IHS is not valid. If the cryptographic signature is valid at 750, then the flow chart transitions to 770. At block 770 the auditing system verifies based at least in part on the determination that the cryptographic signature is valid, the information regarding the IHS. The flowchart transitions from 770 to 780 where the auditing system analyzes the information regarding the IHS to perform a security audit of the IHS.

In accordance with the foregoing, embodiments of the present systems and methods employ intelligent actions derived on availability of platform security characteristics, workload threat analysis, and vulnerability profiling to provide security auditing and remote attestation via kernel-signed metrics. . . .

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
a chipset comprising a processor; and
a memory coupled to the processor, the memory having program instructions stored thereon that, upon execution, cause the processor to:
receive a request from an external auditing system for information regarding the IHS;

request, from a kernel of the IHS, the information regarding the IHS;

receive, from the external auditing system, a cryptographic nonce;

provide, to the kernel of the IHS, the cryptographic nonce;

receive, from the kernel of the IHS, the information regarding the IHS comprising a cryptographic signature and the cryptographic nonce, wherein the cryptographic signature was produced using a private key of the IHS; and provide the information regarding the IHS comprising the cryptographic signature and the cryptographic nonce to the external auditing system for verification and analysis by the external auditing system based at least in part on the cryptographic signature and the cryptographic nonce, whereby the chipset is audited, wherein auditing logic or code on the external auditing system has rules and logic to ascertain what is and is not a proper, valid operation of the chipset under audit;

wherein the information regarding the IHS further comprises information from a secure overlay of a kernel device driver, filesystem, or module of the IHS, and wherein contents of the secure overlay are wrapped in a Trusted Platform Module (TPM) or a secured signing system-signed envelope.

2. The IHS of claim 1, wherein the private key is stored in the TPM.

3. The IHS of claim 2, wherein the cryptographic signature was produced by the kernel using the private key stored in the TPM.

4. The IHS of claim 2, wherein the cryptographic signature was produced by the TPM using the private key stored in the TPM.

5. A method for security auditing of a chipset via kernel-signed metrics, the method comprising:

requesting, from an Information Handling System (IHS), information regarding the IHS, wherein the requesting, from the IHS, information regarding the IHS comprises requesting information from a secure overlay of a kernel device driver, filesystem, or module of the IHS, and wherein contents of the secure overlay are wrapped in a Trusted Platform Module (TPM) or a secured signing system-signed envelope;

receiving, from the IHS, a response comprising the information regarding the IHS and a cryptographic signature, wherein the information regarding the IHS and the cryptographic signature was provided by a kernel of the IHS, wherein the information regarding the IHS received from the IHS is encrypted, and wherein the cryptographic signature was produced using a private key of the IHS;

determining, based at least in part on a public key associated with the IHS, that the cryptographic signature is valid, wherein the determining further comprises:

decrypting the information regarding the IHS using the public key to produce decrypted information regarding the IHS and the cryptographic nonce; and determining that the decrypted information regarding the IHS and the cryptographic nonce are valid; and verifying by an auditing system, based at least in part on the determination that the cryptographic signature is valid, the information regarding the IHS, whereby the chipset is audited, wherein auditing logic or code on the auditing system has rules and logic to ascertain what is and is not a proper, valid operation of the chipset under audit.

6. The method of claim 5 further comprising:

analyzing the information regarding the IHS to perform a security audit of the IHS.

7. The method of claim 5, wherein the private key is stored in the TPM.

8. The method of claim 7, wherein the cryptographic signature was produced by the kernel using the private key stored in the TPM.

9. The method of claim 7, wherein the cryptographic signature was produced by the TPM using the private key stored in the TPM.

10. The method of claim 5, wherein the requesting, from the IHS, information regarding the IHS further comprises:

requesting information from the secure overlay of the filesystem of the IHS.

11. A memory storage device having program instructions stored thereon that, upon execution by one or more processors of a chipset of one or more Information Handling Systems (IHSs), cause the one or more IHSs to:

receive, by a kernel of the IHS, a request for information regarding the IHS, wherein the information regarding the IHS comprises information from a secure overlay of a kernel device driver, filesystem, or module of the IHS, and wherein contents of the secure overlay are wrapped in a Trusted Platform Module (TPM) or a secured signing system-signed envelope;

receive, by the kernel of the IHS, a cryptographic nonce;

obtain, by the kernel, the information regarding the IHS;

determine a cryptographic signature based at least in part on the cryptographic nonce, the information regarding the IHS, and a private key associated with the IHS; and provide, by the kernel, the cryptographic nonce, the information regarding the IHS, and the cryptographic signature for verification and analysis by an auditing system, whereby the chipset is audited, wherein auditing logic or code on the auditing system has rules and logic to ascertain what is and is not a proper, valid operation of the chipset under audit.

12. The memory storage device of claim 11, wherein the private key is stored in the TPM.

13. The memory storage device of claim 12, wherein to determine the cryptographic signature, the program instructions further cause the one or more IHSs to:

obtain, by the kernel, the private key from the TPM; and determine the cryptographic signature, by the kernel, using the private key stored in the TPM.

14. The memory storage device of claim 12, wherein to determine the cryptographic signature, the program instructions further cause the one or more IHSs to:

determine the cryptographic signature, by the TPM, using the private key stored in the TPM.

* * * * *